(12) United States Patent
Mori

(10) Patent No.: US 8,890,028 B2
(45) Date of Patent: Nov. 18, 2014

(54) LASER PROCESSING SYSTEM HAVING AUXILIARY CONTROLLER

(71) Applicant: Fanuc Corporation, Yamanashi (JP)

(72) Inventor: Atsushi Mori, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/661,417

(22) Filed: Oct. 26, 2012

(65) Prior Publication Data

US 2013/0126492 A1 May 23, 2013

(30) Foreign Application Priority Data

Nov. 17, 2011 (JP) ................................. 2011-251873

(51) Int. Cl.
| | | |
|---|---|---|
| *B23K 26/02* | (2014.01) | |
| *B23K 26/30* | (2014.01) | |
| *B23K 26/06* | (2014.01) | |
| *B23K 26/00* | (2014.01) | |
| *B23K 26/03* | (2006.01) | |

(52) U.S. Cl.
CPC ................. *B23K 26/00* (2013.01); *B23K 26/42* (2013.01); *B23K 26/0626* (2013.01); *B23K 26/03* (2013.01)
USPC .................................................. 219/121.83

(58) Field of Classification Search
USPC ........... 219/121.61, 121.62, 121.83; 372/8, 9, 372/29.01, 29.014, 29.015, 29.021, 38.1, 372/38.01, 38.02, 38.07; 700/166
See application file for complete search history.

(56) References Cited

U.S. PATENT DOCUMENTS

| | | | |
|---|---|---|---|
| 6,140,604 A | 10/2000 | Somers et al. | |
| 2003/0183608 A1* | 10/2003 | Yamazaki et al. | ....... 219/121.83 |
| 2005/0092724 A1* | 5/2005 | Warren et al. | ............ 219/121.85 |
| 2005/0179970 A1* | 8/2005 | D'Angelo et al. | ............... 359/32 |
| 2007/0114213 A1* | 5/2007 | Chen | ........................ 219/121.83 |
| 2009/0314752 A1* | 12/2009 | Manens et al. | ........... 219/121.69 |

FOREIGN PATENT DOCUMENTS

| | | | |
|---|---|---|---|
| EP | 61034 A1 * | 9/1982 | |
| JP | 292482 A | 4/1990 | |
| JP | 2-179377 A | 7/1990 | |
| JP | 5-154676 A | 6/1993 | |
| JP | 05154676 A * | 6/1993 | |

OTHER PUBLICATIONS

Office Action mailed Jul. 15, 2013 corresponds to German patent application No. 102012022056.1.

* cited by examiner

*Primary Examiner* — Tu B Hoang
*Assistant Examiner* — Brandon Harvey
(74) *Attorney, Agent, or Firm* — Lowe Hauptman & Ham, LLP

(57) ABSTRACT

A laser processing system includes: a numerical control device (1) outputting a laser output signal and a digital signal; a converter (231) converting the laser output signal to an analog signal; a pulse signal generator (22) generating a pulse signal for controlling the analog signal; an auxiliary controller (7) generating a logic signal which forcedly controls transmission/stop of a laser beam; a logical operation unit (28, 29) outputting a result of the logical operation between the pulse signal and the logic signal; a switching device (27) generating a laser drive signal for alternately transmitting/stopping the laser output on the basis of the logical operation result; and a sensor (6) for measuring intensity of light radiated or reflected from a workpiece irradiated with a laser beam. The auxiliary controller (7) generates the logic signal in accordance with the intensity of the light measured by the sensor (6).

9 Claims, 10 Drawing Sheets

FIG.6A
FIG.6B
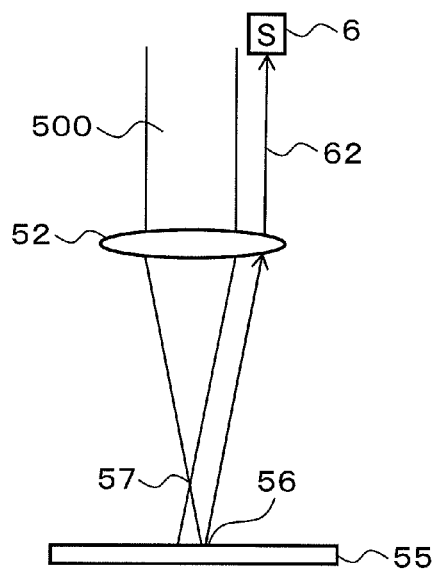
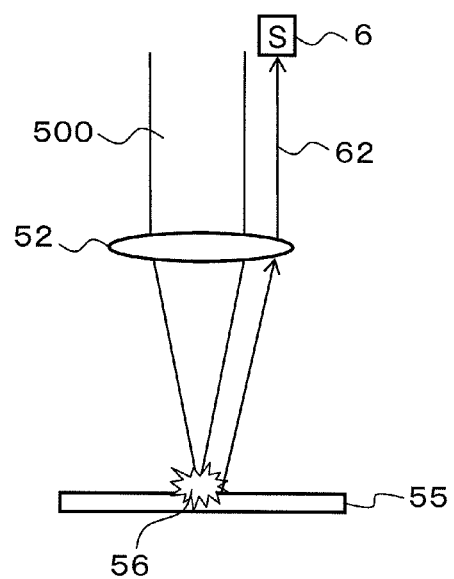

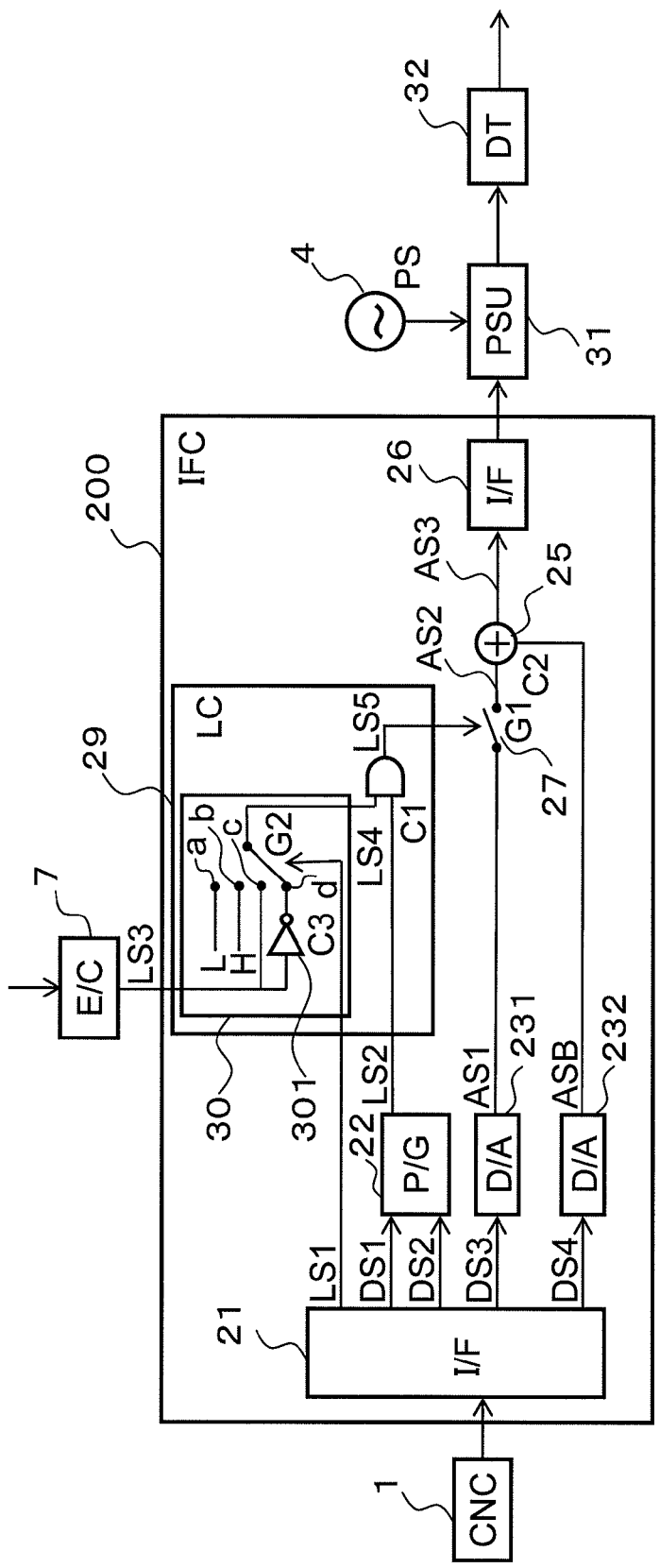

LASER PROCESSING SYSTEM HAVING AUXILIARY CONTROLLER

This application is a new U.S. patent application and claims benefit of JP 2011-251873, filed on Nov. 17, 2011, the content of JP 2011-251873 is incorporated herein by reference.

FIELD OF THE INVENTION

The present invention relates to a laser processing system and, more specifically, to a laser processing system having an auxiliary controller for controlling output of a laser at high speed.

BACKGROUND OF THE INVENTION

Laser processing systems in recent years are controlled by a numerical control device performing CNC (computer numeric control), and various functions can be realized by digital control of software. In these laser processing systems, a laser beam is obtained by discharge-exciting a laser medium by a laser power supply device or irradiating a laser medium with excitation light from an excitation light source. The laser beam is condensed to a small region on a workpiece by a condenser lens or the like to conduct a laser process.

In such a system, a digital signal from the numerical control device is converted to an analog signal, and the analog signal is supplied to a laser power supply device. The laser power supply device supplies electric energy to a laser medium in accordance with the analog signal. In such a manner, a laser beam having intensity as instructed is output at an instructed timing. From the numerical control device, a digital signal is transmitted in short cycles of 0.5 [ms] to 8 [ms]. The digital signal is converted to an analog signal, and the analog signal is transmitted to the laser power supply device. Further, the laser medium is excited, and a laser beam is emitted. In many cases, the operation from the digital signal transmission to output of the laser beam is completed within 0.1 [ms].

The procedure for laser cutting a workpiece by irradiating the workpiece with a laser beam is as follows. First, a process head for condensing a laser beam to the workpiece is brought close to a cutting start point in the workpiece. After the distance between the process head and the workpiece is optimized, piercing process is performed in the cutting start point on the workpiece. After completion of the piercing process, the irradiation position of the laser beam is moved in a desired direction and cutting of the workpiece is performed.

When an abnormality occurs in the laser process on the workpiece, output of the laser beam has to be stopped promptly in order to minimize damage to the workpiece. An abnormality in the laser process can be detected as abnormal radiation light from a process point in the workpiece irradiated with the laser beam. A technique of detecting an abnormality in the laser process in accordance with intensity of radiation light from the process point is known (for example, patent document 1).

The configuration of a conventional laser processing system will be described with reference to FIG. 1. According to a control signal from a processor 1021, an I/O unit 1024 drives a laser oscillator 1002. From the laser oscillator 1002, a pulse-shaped laser beam 1006 is emitted. The laser beam 1006 is reflected by a mirror 1003 and sent to a laser machine 1004.

The laser machine 1004 is provided with a table 1007 to which a workpiece 1008 is fixed and a process head 1005 for irradiating the workpiece 1008 with the laser beam 1006. The laser beam 1006 introduced to the process head 1005 is condensed near a process nozzle 1005a and the condensed light is emitted to the workpiece 1008. The laser machine 1004 is provided with servo motors 1009 and 1010 for moving the table 1007 in the X and Y axes. The laser machine 1004 is also provided with a servo motor 1011 for moving the process head 1005 in the vertical directions. The servo motors 1009, 1010, and 1011 are connected to servo amplifiers 1027, 1028, and 1029, respectively, and rotated in accordance with axis control signals from the processor 1021. An instruction to the laser machine 1004 is given via an input/output terminal 1025. To the process head 1005, a light amount detector 1012 is attached. The light amount detector 1012 detects radiation light generated at a process point (cutting point) via a lens (not shown) and outputs a signal of magnitude proportional to the detected light amount. The detection signal is amplified by an amplifier 1013 and the amplified signal is input to an A/D converter 1026 which converts the analog signal to a digital signal. An output of the A/D converter 1026 is supplied to the processor 1021.

During cutting of the workpiece, the amount of light detected by the light amount detector 1012 and generated at the process point to which the light is supplied via the amplifier 1013 and the A/D converter 1026 is read. The amount of the detected light is compared with a preset value of criterion of process abnormality. When the amount of the detected light is equal to or less than the criterion value, it is determined that no process abnormality has occurred. On the other hand, when the amount of the detected light is larger than the criterion value, the processor 1021 outputs an abnormality signal. By closing a laser beam blocking shutter (not shown) in the laser oscillator 1002 via the I/O unit 1024, the process is stopped. It takes at least some milliseconds to ten or longer milliseconds to close the laser beam blocking shutter on the basis of the light amount detected by the light amount detector 1012.

In the case of controlling an output of the laser on the basis of the light emission phenomenon at the process point by the laser irradiation like in the above-described conventional technique, there is a case that response speed to execute a process within 0.5 [ms] since an abnormality is detected until the process is stopped in order to prevent a workpiece from being damaged is required. However, as described above, in the conventional technique, it takes a few milliseconds to ten or longer milliseconds, since the light amount detector detects an abnormality until it is reflected in a laser output, which may result in workpiece being damaged.

Generally, laser cutting cannot be performed on an unprocessed workpiece under cutting process conditions from the beginning. Specifically, piercing process of forming a hole at a cutting start point has to be performed prior to the cutting process. First, the laser process head is brought close to the workpiece and is maintained at height optimum to the piercing process on the workpiece. Copper, brass, or aluminum alloy as a representative material of the workpiece has high reflectance to light including the infrared region used for a high-output laser. When the position of the light condensing point in the workpiece is not optimum, the laser beam reflected by the surface of the workpiece damages the mirror in a laser resonator, a fiber for excitation, and the like. Further, it may damage a mirror of a duct for beam transmission, a lens, and a fiber. Therefore, the light condensing point is positioned in an optimum position and, then, the laser beam has to be emitted.

Even when the workpiece is a flat plate, the workpiece may be, for example, slightly warped. In the laser processing system, the distance between the workpiece and the process nozzle is always measured by, for example, measuring capacitance between them. Feedback control is performed with the Z axis so that the distance between them is kept constant to make the distance between the process nozzle and the workpiece and the position of the light condensing point each having a narrow tolerance constant. At this time, it takes a few milliseconds to ten or more milliseconds since the distance between the process nozzle and the workpiece becomes optimum distance until irradiation of a laser beam is started, and causes an increase in time.

Further, the time required for the piercing process is not constant. That is, the process time varies even for the same workpiece due to various factors such as the properties, temperature, and the like of the surface of the workpiece. Therefore, in the laser cutting, the longest time to complete the piercing process is set as piercing process time. After the set process time elapses, the cutting process is performed. A laser process system of detecting completion of piercing process by a light amount detector is also known (for example, patent document 2). When the piercing process starts, light is emitted strongly at the process point. When the piercing process progresses and the hole penetrates the workpiece, light emission weakens. The light amount detector which detects light emission at the process time detects the change in strength and the end of the piercing process. After that, the laser output is stopped, and the cutting process is performed. In such a manner, the piercing process can be finished according to the length of the actual piercing process time. Therefore, the tact time can be shortened more than the case of performing the piercing process using the longest piercing time which is set as the piercing process time.

However, in the conventional method as described above, it takes a few milliseconds to ten or longer milliseconds since a signal from a light amount detector continues to be received until laser irradiation is actually stopped. The time is unignorable in the case of a laser process in which a process failure occurs when laser irradiation continues and heat input becomes excessive. Although the problem can be solved by endlessly shortening the interpolation cycle of the numerical control device, the computing power of the numerical control device is limited and the interpolation cycle cannot be shortened if various effective functions are not eliminated. Consequently, to shorten the interpolation cycle of the numerical control device, software and hardware generated on precondition that control is performed in predetermined interpolation cycles is largely changed. This is not a realistic solution.
Patent Document 1: JP-A-5-154676
Patent Document 2: JP-A-2-179377

The conventional laser processing system has a problem such that, in digital control by a numerical control device, since it takes too much time for a laser control instruction based on detection of an abnormality by a light amount sensor or detection of completion of a process until stop of a laser output.

SUMMARY OF THE INVENTION

To solve the problem, a laser processing system according to the present invention comprises: a numerical control device outputting a laser output signal for determining a laser output value and a digital signal for determining a transmission period and a stop period of a laser output in predetermined transmission cycles; a converter converting the laser output signal to an analog signal; a pulse signal generator generating a pulse signal for controlling the analog signal on the basis of the digital signal; an auxiliary controller generating a logic signal which forcedly controls transmission or stop of a laser beam; a logical operation unit performing logical operation between the pulse signal and the logic signal and outputting a result of the logical operation; a switching device generating a laser drive signal for alternately transmitting/stopping the laser output on the basis of the logical operation result; and a sensor measuring intensity of light radiated or reflected from a workpiece irradiated with a laser beam which is output in accordance with the laser drive signal. The auxiliary controller generates the logic signal in accordance with the intensity of the light measured by the sensor.

In the laser processing system according to an embodiment of the present invention, preferably, when the intensity of the light radiated from the workpiece measured by the sensor is equal to or higher than predetermined intensity, the auxiliary controller outputs a logic signal for stopping the laser output.

In the laser processing system according to another embodiment of the present invention, when the intensity of the light reflected from the workpiece measured by the sensor is equal to or higher than predetermined intensity, the auxiliary controller may output a logic signal for transmitting the laser output.

In the laser processing system according to further another embodiment of the present invention, the logical operation unit may further have a switching device switching between use and non-use of the logic signal output from the auxiliary controller. Preferably, the control signal sent to the switching device is sent in predetermined transmission cycles from a numerical control device in addition to a laser output signal for determining a laser output value and a digital signal for determining a transmission period and a stop period of a laser output.

In the invention according to an embodiment, a logical operation is performed using a signal in predetermined transmission cycle from the numerical control device and a high-speed signal from the auxiliary controller and, according to the result of the logical operation, the laser output is on/off controlled. Consequently, for example, abnormality of a laser process or end of a process is detected at high speed by the auxiliary controller and laser irradiation is controlled on the basis of the result, increase in the speed of various processes can be realized. Further, a flexible laser processing system can be realized such that according to the kind of a laser process, transmission/stop of a laser beam is selected on the basis of a logic signal from the auxiliary controller, or laser control is performed only by an instruction from the numerical control device regardless of a signal from the auxiliary controller.

In the invention according to another embodiment, during movement of the process head toward a process point in a workpiece, at the moment the amount of light from the workpiece generated according to a result of irradiation of a laser beam or a distance measurement laser beam becomes larger than a preset value, a laser output can be increased by a signal from the auxiliary controller. Consequently, piercing process can be started at the earliest timing, and the time of the laser process can be shortened.

DESCRIPTION OF THE DRAWINGS

These and other features and advantages of the present invention will be better understood by reading the following detailed description, taken together with the drawings wherein:

FIGS. 6A and 6B are diagrams each showing the relation between a laser beam and reflection light when a process head is brought close to a workpiece;

FIG. 10 is a configuration diagram of an interface circuit according to a third embodiment.

DETAILED DESCRIPTION OF THE PREFERRED EMBODIMENTS

Figure 1:
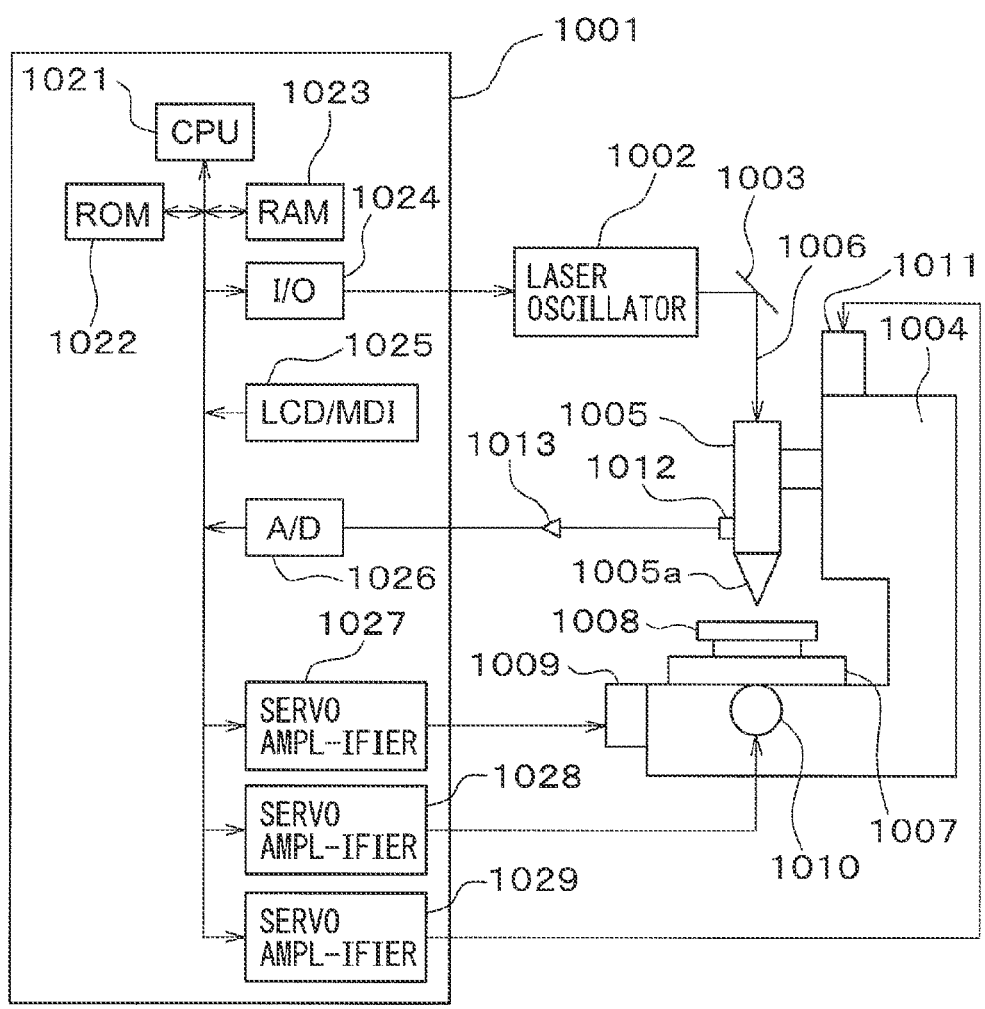
FIG. 1 is a configuration diagram of a conventional laser processing system.

Referring to the drawings, a laser processing system will be described. It should be noted that the technical scope is not limited to embodiments of the system but includes the invention described in the scope of claims for patent and its equivalents.

First Embodiment

Figure 2:
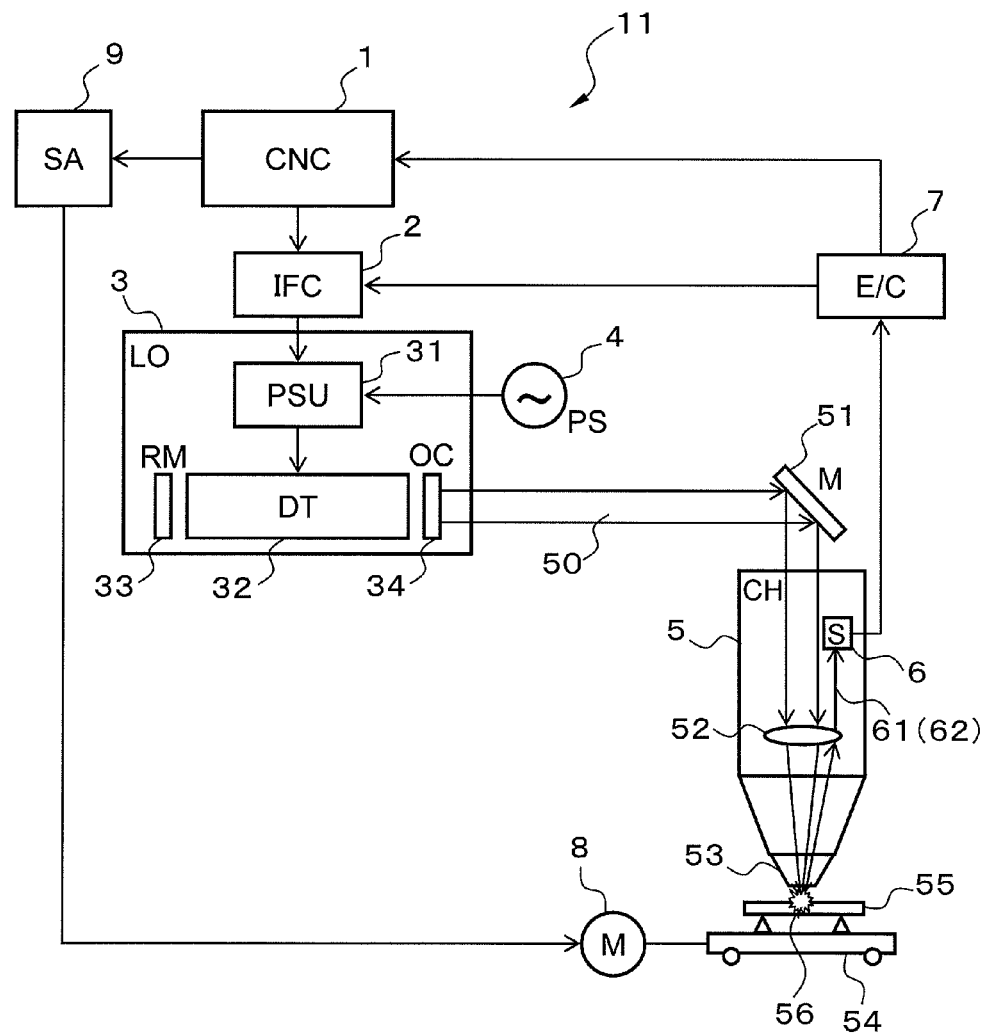
FIG. 2 is a configuration diagram of a laser processing system according to a first embodiment.

FIG. 2 is a configuration diagram of a laser processing system according to a first embodiment.

Figure 3:
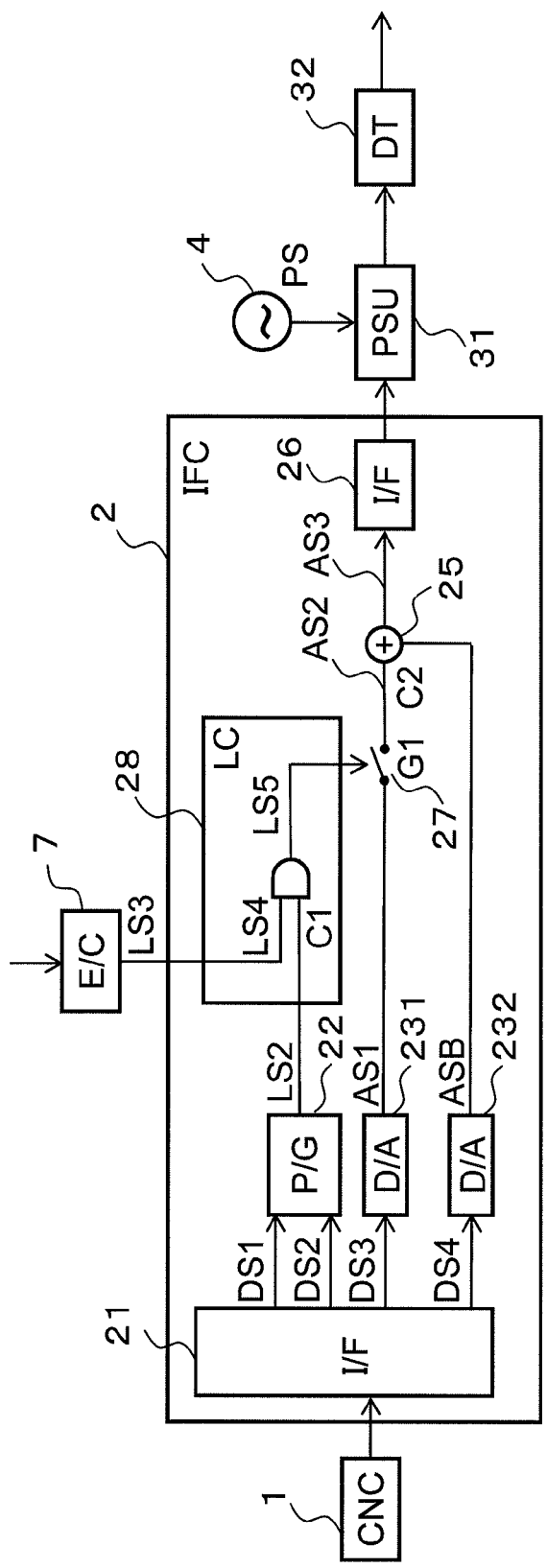
FIG. 3 is a configuration diagram of an interface circuit in the first embodiment.
Figure 4:
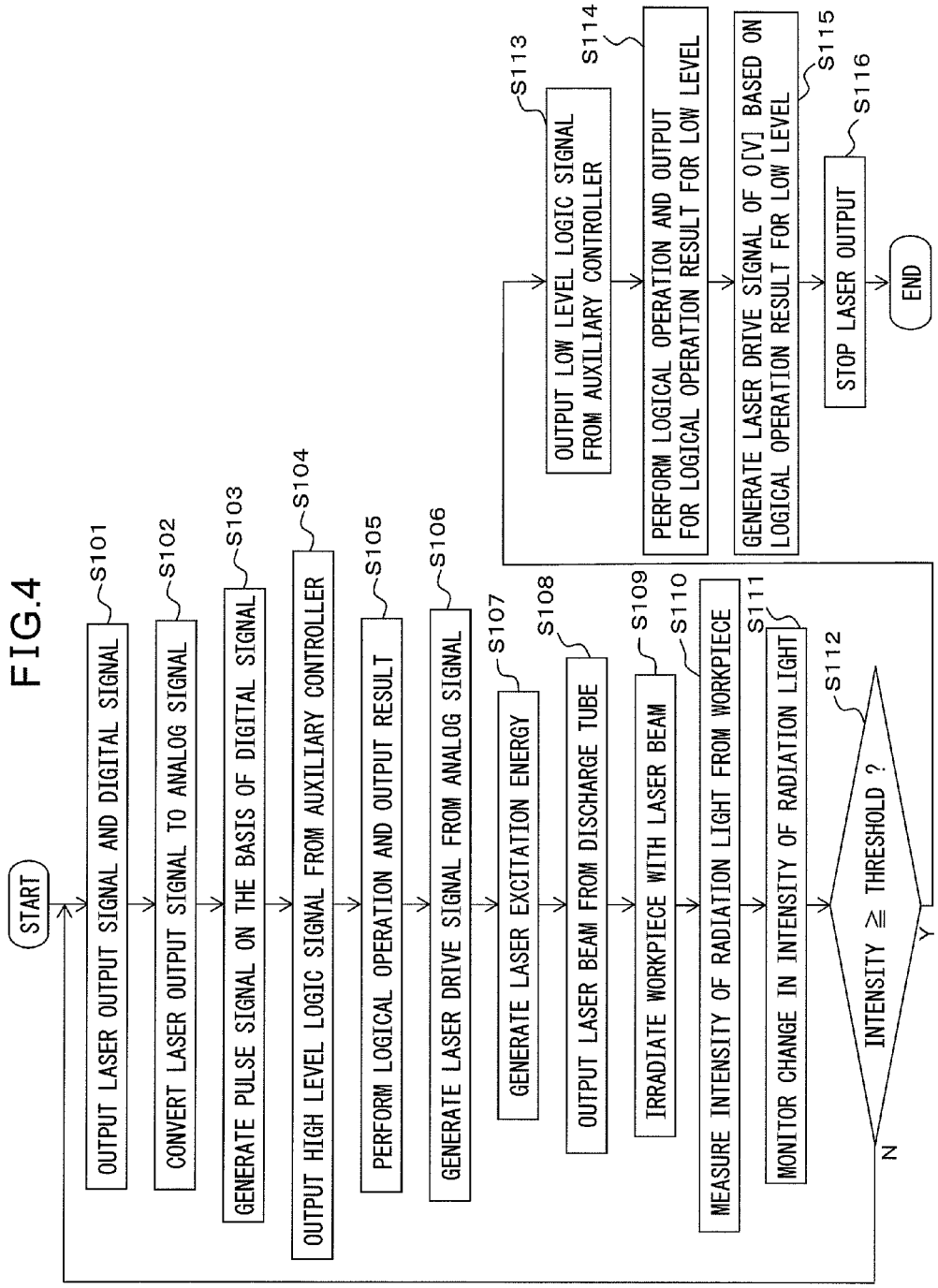
FIG. 4 is a flowchart showing the procedure of a laser processing method according to the first embodiment.

FIG. 3 shows the configuration of an interface circuit in the laser processing system according to the first embodiment. A laser processing system 11 has a numerical control device 1 outputting a laser output signal for determining a laser output value and a digital signal for determining a transmission period and a stop period of a laser output, a converter 231 converting the laser output signal to an analog signal, an auxiliary controller 7 generating a logic signal that forcedly controls transmission/stop of a laser beam, a pulse signal generator 22 generating a pulse signal for controlling the analog signal on the basis of the digital signal, a logical operation unit 28 performing logical operation using the pulse signal and the logic signal and outputting a result of the logical operation, and a switching device 27 generating a laser drive signal for alternately transmitting and stopping the laser output on the basis of the result of the logical operation. The laser processing system 11 also has a laser power supply unit 31 generating laser excitation energy in accordance with the laser drive signal, a discharge tube 32 exciting a laser medium using the excitation energy generated by the laser power supply unit 31, a process head 5 irradiating a workpiece 55 with a laser beam amplified by the discharge tube 32, and a sensor 6 measuring the intensity of light radiated or reflected from the workpiece 55 as a result of the laser beam emitted from the process head 5. The laser processing system 11 according to the first embodiment is characterized by a point that the auxiliary controller 7 generates a logic signal that forcedly controls transmission/stop of a laser beam in accordance with the intensity of the light measured by the sensor 6.

The laser processing system 11 has a servo motor 8 for moving a table 54 on which the workpiece 55 is put in the horizontal direction, a motor (not shown) moving the process head 5 in the vertical direction, and a servo amplifier 9 driving the motors.

Next, a laser processing method by the laser processing system 11 will be described with reference to the flowchart of FIG. 5. In the first embodiment, the case of executing the laser process and, when abnormal radiation light from the workpiece is sensed, stopping the laser process will be described as an example.

In step S101, the numerical control device 1 outputs a laser output signal (refer to FIG. 3) for determining a laser output value and digital signals DS1 and DS2 for determining a transmission period and a stop period of the laser output via an interface 21 in predetermined transmission cycles. The digital signals DS1 and DS2 are signals for determining the laser transmission period and the laser stop period, respectively, to generate pulse-shaped laser drive signals. Typically, each of the transmission period and the stop period is 10 [µs] to 50 [ms]. The digital signals DS1 and DS2 are digital data of 10 bits to 16 bits and are synchronized with a transmission cycle (interpolation cycle) of a movement amount for moving the workpiece.

Even in a period of no laser output, in order to inject some preparation energy to the laser medium, a bias signal DS4 for adding a bias instruction voltage corresponding to the preparation energy amount to the laser drive signal which is supplied to the laser power supply unit in the post stage may be output.

In step S102, the converter 231 converts the laser output signal DS3 to an analog signal AS1. FIG. 5 shows the waveform of the analog signal AS1. In FIG. 5, the horizontal axis indicates time, and the vertical axis indicates voltage level. The voltage value of the analog signal AS1 is Vc [V] in the period of driving the laser and is 0 [V] in the period of stopping the laser. When the bias signal DS4 is input, it is converted to an analog signal by a bias voltage converter 232, thereby obtaining a bias instruction signal ASB.

In step S103, the pulse signal generator 22 generates a pulse signal LS2 on the basis of the digital signals DS1 and DS2. FIG. 5 shows the waveform of the pulse signal LS2. In the laser beam transmission period determined by the digital signal DS1, the value of the pulse signal LS2 is high "H". On the other hand, in the laser beam stop period determined by the digital signal DS2, the value of the pulse signal LS2 is low "L". When the laser beam stop period is completed, the pulse signal generator 22 sets the value of the pulse signal LS2 to the high level again. By repeating the operation, a plurality of pulses P1 to P5 are obtained. Since the signals DS1 and DS2 are input in the interpolation cycles, until the values of the signals DS1 and DS2 are newly changed, the pulse sequence is continued.

In step S104, the auxiliary controller 7 outputs a logic signal LS3 of the high level. FIG. 5 shows the waveform of the logic signal LS3. The state that the logic signal LS3 is in the high level in the period of time $t=t_0$ to $t_1$ means that the laser process is executed. As will be described later, the state that the logic signal LS3 is at the low level after the time $t=t_1$ indicates that the sensor 6 detects abnormal radiation light 61 (refer to FIG. 2) from the workpiece 55 at the time $t=t_1$ and, on the basis of the detection result, the auxiliary controller 7 outputs the logic level LS3 of the low level. The "radiation light" is defined as light irradiated from the workpiece when the workpiece is irradiated with a laser beam for piercing process or cutting process.

In step S105, the logical operation unit 28 performs logical operation using the pulse signal LS2 and the logic signal LS3 of the high level and outputs a logical operation result LS5.

The logical operation in this case is logical product ("AND"). FIG. 5 shows the waveform of the logical operation result LS5. Since the logic signal LS3 is at the high level in the period of the time t=$t_0$ to $t_1$, the waveform of the logical operation result LS5 is similar to that of the pulse signal LS2 in the same period. As a result, pulses P11, P12, and P13 similar to the pulses P1, P2, and P3 of the pulse signal LS2 are obtained. On the other hand, although a pulse P14 of the logical operation result LS5 corresponding to the pulse P4 of the pulse signal LS2 is at the high level until the time t=$t_1$, it becomes the low level at and after the time $t_1$. A pulse P15 of the logical operation result LS5 corresponding to the pulse P5 of the pulse signal LS2 is always at the low level, and is not observed as a pulse waveform.

In the following step S106, the switching device 27 generates a laser drive signal AS2 from the analog signal AS1 on the basis of the logical operation result LS5. As shown in FIG. 3, the switching device 27 enters the on state when the logical operation result LS5 is at the high level, and the laser drive signal AS2 becomes Vc [V] which is the same as that of the analog signal AS1. The switching device 27 enters the off state when the logical operation result LS5 is at the low level, and the laser drive signal AS2 becomes 0 [V]. As a result, the laser drive signal AS2 has the maximum value Vc [V] and its pulse waveform has a transmission cycle similar to that of the logical operation result LS5. The on/off state of the signal in the switching device 27 is reflected in the laser output within 10 [μs].

Figure 5:
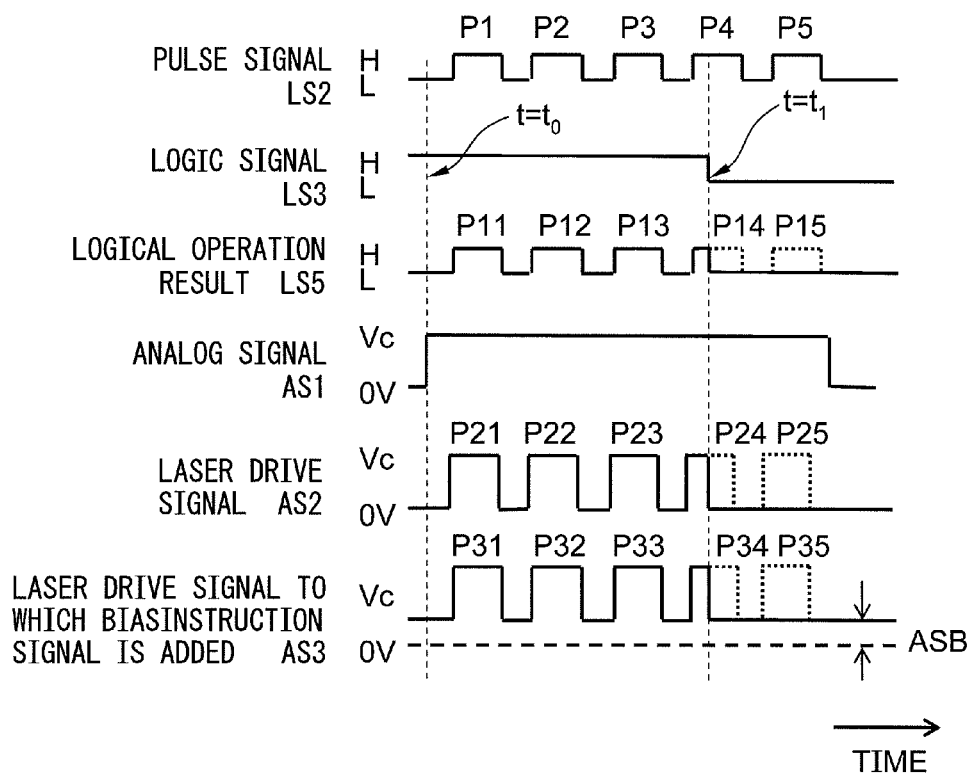
FIG. 5 is a waveform chart of signals in the interface circuit in the first embodiment.

FIG. 5 shows the waveform of the laser drive signal AS2. In the period of the time t=$t_0$ to $t_1$, the waveform of the laser drive signal AS2 is similar to that of the logical operation result LS5. As a result, pulses P21, P22, and P23 similar to the pulses P11, P12, and P13 of the logical operation result LS5 are obtained. On the other hand, although a pulse P24 of the laser drive signal AS2 corresponding to the pulse P14 of the logical operation result LS5 is Vc [V] until the time t=$t_1$, it becomes 0 [V] after the time $t_1$. A pulse P25 of the laser drive signal AS2 corresponding to the pulse P15 of the logical operation result LS5 is always 0 [V] and is not observed as a pulse waveform. In the case of adding the bias instruction signal ASB to the laser drive signal AS2 by an adder 25, the waveform of the laser drive signal AS3 to which the bias instruction signal ASB is added becomes a signal waveform obtained by adding a predetermined bias instruction signal ASB to the laser drive signal AS2 as shown in FIG. 5. As a result, the pulse waveform having pulses P31 to P35 similar to the pulses P21 to P25 of the laser drive signal AS2 is obtained.

In step S107, the laser power supply unit 31 receives supply of power from a power supply 4 and generates laser excitation energy in accordance with the laser drive signal AS3 to which the bias instruction signal is added and which is supplied via an interface 26. As described above, the laser drive signal AS3 to which the bias instruction signal is added has the pulse waveform determined by the digital signals DS1 and DS2 and the logic signal LS3, so that the excitation energy has a pulse waveform similar to P31 to P35.

In step S108, the discharge tube 32 outputs a laser beam 50 using the excitation energy. Specifically, the excitation energy is supplied to the discharge tube 32, the laser medium sandwiched between an output mirror 34 and a rear mirror 33 oscillates, and the laser beam 50 is output. The laser beam 50 output from the discharge tube 32 is guided to the process head 5 by using a reflecting mirror 51 or an optical fiber (not shown).

In step S109, the process head 5 irradiates the workpiece 55 with the laser beam 50 output from the discharge tube 32. Concretely, by a lens 52 provided in the process head 5, the laser beam 50 is condensed on the workpiece 55. The laser beam 50 passes through a process nozzle 53 provided at the tip of the process head 5 and falls on the workpiece 55. From the process nozzle 53, assist gas such as nitrogen or oxygen is simultaneously supplied. The temperature of the workpiece 55 on which the laser beam 50 is condensed and applied becomes high temperature which is generally 1000 [° C.] or higher. As a result, by melting elimination or the like by the flow of assist gas supplied simultaneously, various processes such as laser cutting are realized.

Typically, the laser output is 1 [kW] to 10 [kW], the size of the light condensing point on the workpiece 55 is 0.01 [mm] to 1 [mm], and the distance between the lens 52 and the workpiece 55 is 50 [mm] to 500 [mm]. The process nozzle 53 is generally made of copper and its diameter is 0.5 [mm] to 6 [mm]. The pressure of the assist gas in the process nozzle 53 is 0.01 [MPa] to 3 [MPa]. The workpiece 55 is selected not only from a steel plate or a steel pipe but also from various materials such as press-molded metal or various resins, stainless steel, aluminum alloy, brass, copper, and the like. The distance between the process nozzle 53 and the workpiece 55 is 0.5 [mm] to 50 [mm] and, at the time of cutting process, is maintained in the range of 0.5 [mm] to 4 [mm]. The light condensing point (focal point) of the condensed laser beam 50 is within 10 [mm] from the surface of the workpiece 55.

The laser process is performed by scanning the surface of the workpiece 55 with the light condensing point. For the scan with the light condensing point, the relative position between the process nozzle 53 and the workpiece 55 is moved by using the servo amplifier 9. Both of a laser oscillator 3 and the servo amplifier 9 are controlled by the numerical control device 1. The numerical control device 1 decodes an NC program and transmits a movement amount to each of the X axis, the Y axis, the Z axis, and the other servo amplifier 9. The movement amount is transmitted in predetermined cycles. Consequently, the axes are driven synchronously and the process head 5 can be moved above the workpiece 55 so as to draw a circular arc or a straight line. The cycle of transmitting the movement amount is called the interpolation cycle and is typically set to 0.5 [ms] to 8 [ms].

In step S110, the sensor 6 measures the intensity of the radiation light 61 from the workpiece 55. As shown in FIG. 2, the laser processing system 11 has the sensor 6 for monitoring the state of a process point 56. When the laser beam 50 is condensed by the lens 52 and applied to the surface of the workpiece 55, at the time of laser radiation, light is emitted from the process point 56 because of high temperature. When the light emission amount becomes excessively large, it can be estimated that some abnormality occurs in the workpiece 55. From the sensor 6 which senses the radiation light 61, a signal according to the intensity of the radiation light 61 is transmitted to the auxiliary controller 7.

In step S111, the auxiliary controller 7 monitors a change in the intensity of the radiation light 61. Since the auxiliary controller 7 receives the signal according to the intensity of the radiation light 61 from the sensor 6 from moment to moment, a change in the intensity of the radiation light 61 can be detected.

In step S112, the auxiliary controller 7 determines whether or not the intensity of the radiation light 61 is equal to or higher than a threshold. The threshold may be set to a reference value of intensity of radiation light for determining whether some abnormality occurs in the workpiece 55 or not. When the intensity of the radiation light 61 is less than the threshold, the program returns to step S101 and the laser process is continuously executed.

On the other hand, when the intensity of the radiation light 61 is equal to or larger than the threshold, it is determined that some abnormality occurs in the workpiece 55. In step S113, the auxiliary controller 7 outputs the logic signal LS3 of the low level. As shown in FIG. 5, the logic signal LS3 changes from the high level to the low level at the time t=t$_1$.

In step S114, the logical operation unit 28 performs logical operation using the pulse signal LS2 and the logic signal LS3 of the low level and outputs the logical operation result LS5 of the low level. The logical operation performed by the logical operation unit 28 in this case is logical product ("AND"). FIG. 5 shows the waveforms of the pulse signal LS2, the logic signal LS3, and the logical operation result LS5. Also at and after the time t=t$_1$, although the pulse signal LS2 does not change, the logic signal LS3 becomes the low level. Consequently, the logical operation result LS5 as the AND of the pulse signal LS2 and the logic signal LS3 becomes the low level. Since the timing when the logic signal LS3 changes from the high level to the low level is not related to the rising time and the trailing time of the pulse signal LS2, the pulse P14 of the logical operation result LS5 changes forcedly to the low level before the trailing edge of the pulse.

In step S115, the switching device 27 generates the laser drive signal AS2 of 0 [V] on the basis of the logical operation result LS5 of the low level. FIG. 5 shows the waveform of the laser drive signal AS2. At and after the time t=t$_1$, the logical operation result LS5 is at the low level, so that the switching device 27 is in the off state, and the laser drive signal AS2 is 0 [V]. As described above, the logical operation result LS5 becomes forcedly 0 [V] at the time t=t$_1$, the laser drive signal AS2 also becomes forcedly 0 [V] before the trailing edge of the pulse P24. As a result, the laser drive signal AS3 to which the bias instruction signal is added forcedly becomes only the bias voltage before the trailing edge of the pulse P34 at the time t=t$_1$. In step S116, the laser processing system 11 stops the laser output. The time since the sensor 6 senses the abnormal radiation light 61 until the laser beam is stopped is 10 [μs] or less.

In such a manner, the radiation light 61 from the workpiece 55 is monitored and, when abnormality occurs, the laser output can be stopped instantaneously. Thus, damage in the workpiece can be minimized.

The example of stopping output of a laser beam when the sensor senses abnormal radiation light from the workpiece has been described above. Alternatively, the intensity of a laser beam may be increased or decreased according to the intensity of radiation light. Specifically, when it can be simply determined that intensity of the laser beam 50 is high, not the case where the radiation light 51 from the workpiece 55 indicates occurrence of abnormality in the workpiece 55, the auxiliary controller 7 may transmit a control signal which decreases the intensity of the laser beam. In this case, the auxiliary controller 7 receives a signal from the sensor 6 and transmits a signal to the numerical control device 1 in accordance with the amount of the light. For example, when the light amount is large, the laser output is excessive, so that override on the laser output is changed from 100% to tens %. On reception of the signal, the numerical control device 1 decreases a laser output signal. As a result, the excitation energy injected from the laser power supply unit 31 to the discharge tube 32 decreases, and the laser output also decreases. Therefore, the laser process is controlled so as to be stably performed.

Second Embodiment

A laser processing system according to a second embodiment will now be described. The configuration of the laser processing system according to the second embodiment is similar to that of the laser processing system according to the first embodiment shown in FIG. 2. As shown in FIG. 2, to perform a process by irradiating the workpiece 55 with the laser beam 50, the distance between the process nozzle 53 of the process head 5 and the workpiece 55 has to be optimized. To shorten the tact time, it is important to start irradiation of a laser beam to perform piercing process immediately after the distance between the process nozzle 53 and the workpiece 55 is optimized.

The laser processing system according to the second embodiment is characterized by a point that a laser power supply unit supplies predetermined excitation energy to a discharge tube, thereby irradiating a workpiece with a distance measurement laser beam for measuring the distance between the process nozzle and the workpiece and, when a sensor measures reflection light having predetermined intensity or larger, an auxiliary controller outputs a logic signal for transmitting an output of a laser.

A procedure of bringing the process head close to the workpiece will be described with reference to FIGS. 6A and 6B. FIG. 6A shows a state where a process head (not shown) is brought close to the workpiece 55 and a distance measurement laser beam 500 for measuring the distance between the process nozzle and the workpiece 55 is applied. Preferably, the distance measurement laser beam 500 has intensity weaker than that of a laser beam for processing and does not exert influence on the workpiece but, on the other hand, it is set to intensity at which reflection light from the workpiece can be measured. In this case, the "reflection light" refers to light reflected from the surface of a workpiece when the workpiece is irradiated with a laser beam having intensity of the degree at which the workpiece is hardly influenced. As a distance measurement laser beam for measuring distance using its reflection light, for example, a laser beam having a wavelength in a visible light range and whose output is 4 [mW] or less is used. In FIG. 6A, the distance measurement laser beam 500 is condensed by the lens 52 but the position of a focal point 57 does not match the position of the process point 56. In this case, reflection light 62 of the distance measurement laser beam 500 is detected by the sensor 6 as light having low intensity.

On the other hand, as shown in FIG. 6B, when the focal point 57 matches the process point 56, the reflection light 62 of the distance measurement laser beam 500 is detected by the sensor 6 as light having high intensity. Therefore, the laser processing system according to the second embodiment is characterized in that the piercing process is started immediately after detection of optimization of the distance between the process nozzle and the workpiece 55 on the basis of the intensity of the reflection light 62 sensed by the sensor 6.

Figure 7:
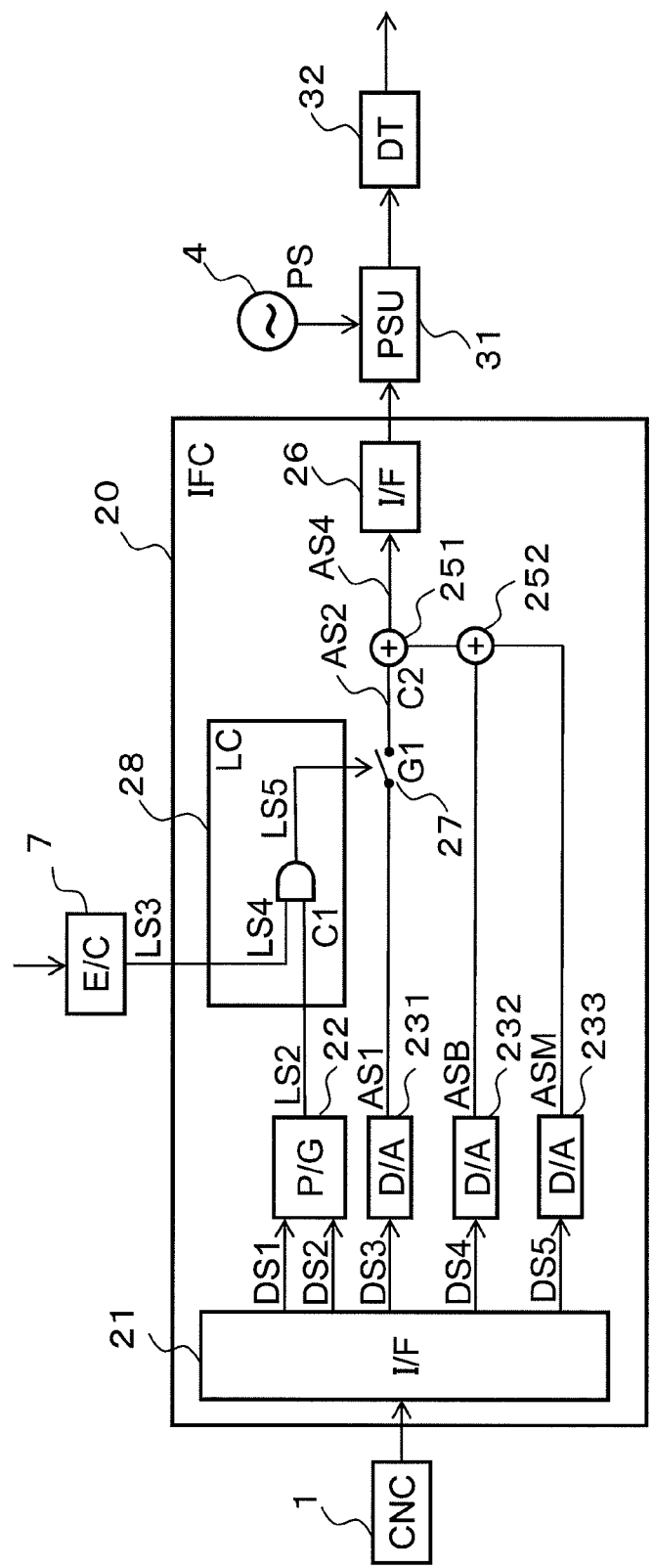
FIG. 7 is a configuration diagram of an interface circuit in a second embodiment.

FIG. 7 shows an interface circuit 20 in the laser processing system according to the second embodiment. The point different from the interface circuit 2 in the laser processing system according to the first embodiment shown in FIG. 3 is that not only the bias instruction voltage as the bias instruction signal ASB but also distance measurement voltage for measuring the distance between the process nozzle and the workpiece by the distance measurement signal ASM are added to the laser drive signal AS2. By using a laser drive signal AS4 obtained by adding the distance measurement voltage to the laser drive signal AS2, even when the laser drive signal AS2 is 0 [V], the distance measurement laser beam for measuring the distance between the process nozzle and the workpiece can be emitted. As a result, the distance between the process nozzle and the workpiece can be measured.

Figure 8:
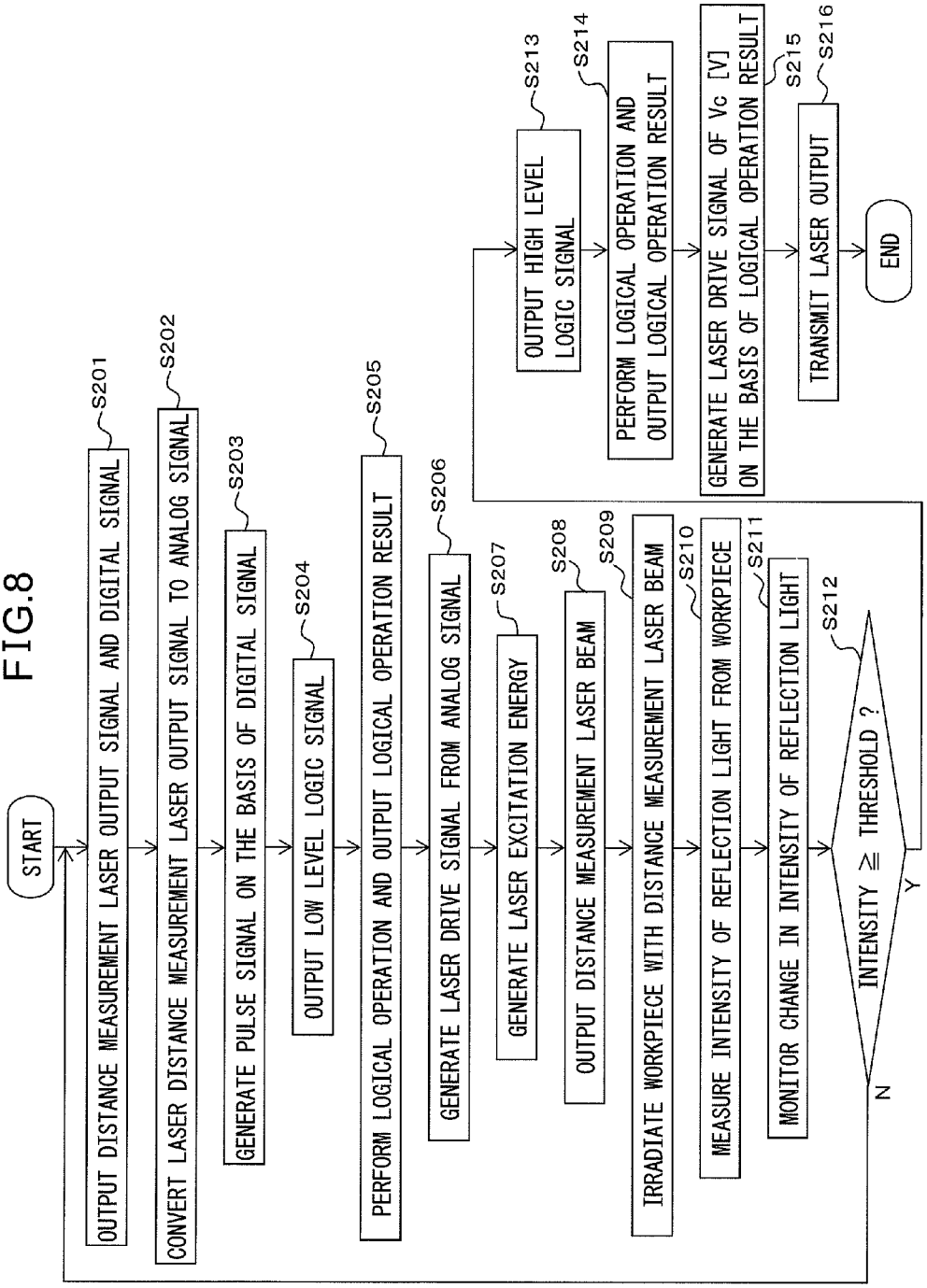
FIG. 8 is a flowchart showing the procedure of a laser processing method according to the second embodiment.

A method of laser process by the laser processing system according to the second embodiment will be described with reference to the flowchart of FIG. 8. In the second embodiment, the case of optimizing the distance between the process nozzle and the workpiece prior to execution of the laser process will be described as an example.

In step S201, the numerical control device 1 outputs, via the interface 21 in predetermined transmission cycles, a laser output signal DS5 (refer to FIG. 7) for emitting a distance measurement laser beam for measuring the distance between the process nozzle 53 (refer to FIG. 2) and the workpiece 55 and the digital signals DS1 and DS2 for determining a transmission period and a stop period of the laser output. Since the digital signals DS1 and DS2 are similar to those of the first embodiment, a detailed description will not be repeated.

In the second embodiment, at the initial stage, the distance between the process nozzle 53 and the workpiece 55 is not optimized and a laser beam for processing the workpiece 55 is not applied. However, it is preferable to emit the laser beam for processing at the moment the distance between the process nozzle 53 and the workpiece 55 is optimized. As shown in FIG. 7, at time point before the laser beam for processing is applied, the laser output signal D3 for determining a laser output value is supplied to the interface circuit 20.

In a manner similar to the first embodiment, even in a period of no laser output, in order to inject some preparation energy to the laser medium, the bias signal DS4 for adding a bias instruction voltage corresponding to the preparation energy amount to the laser drive signal which is supplied to the laser power supply unit in the post stage may be output.

In step S202, a distance measurement voltage converter 233 converts the distance measurement laser output signal DS5 to the distance measurement signal ASM.

Figure 9:
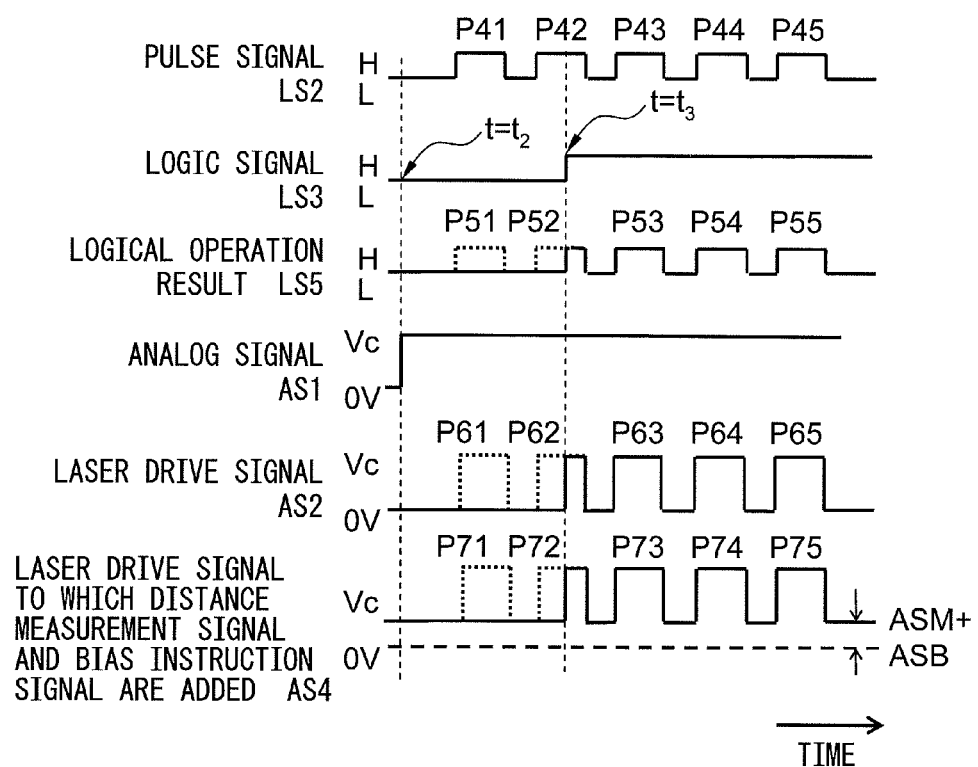
FIG. 9 is a waveform chart of signals in the interface circuit in the second embodiment.

Further, the converter 231 converts the laser output signal DS3 to the analog signal AS1. FIG. 9 shows the waveform of the analog signal AS1. In FIG. 9, the horizontal axis indicates time, and the vertical axis indicates voltage level. The voltage value of the analog signal AS1 is Vc [V] in the period of driving the laser and is 0 [V] in the period of stopping the laser. When the bias signal DS4 is input, it is converted to an analog signal by the bias voltage converter 232, thereby obtaining the bias instruction signal ASB. In the second embodiment, as shown in FIG. 9, it is assumed that the period of time $t=t_2$ to $t_3$ is a stage where the process nozzle 53 is approaching the workpiece 55 and has not reached the optimum position. Consequently, in the period of time $t=t_2$ to $t_3$, a laser beam for processing the workpiece 55 is not applied. However, by setting the analog signal AS1 to a voltage for applying the laser beam, application of the laser beam can be executed at the moment the distance between the process nozzle 53 and the workpiece 55 is optimized.

In step S203, the pulse signal generator 22 generates the pulse signal LS2 on the basis of the digital signals DS1 and DS2. FIG. 9 shows the waveform of the pulse signal LS2. In the laser beam transmission period determined by the digital signal DS1, the value of the pulse signal LS2 is high "H". In the laser beam stop period determined by the digital signal DS2, the value of the pulse signal LS2 is low "L". When the laser beam stop period is completed, the pulse signal generator 22 sets the value of the pulse signal LS2 to the high level again. By repeating the operation, a plurality of pulses P41 to P45 are obtained. Since the signals DS1 and DS2 are input in the interpolation cycles, until the values of the signals DS1 and DS2 are newly changed, the pulse sequence is continued.

In step S204, the auxiliary controller 7 outputs the logic signal LS3 of the low level. FIG. 9 shows the waveform of the logic signal LS3. The state that the logic signal LS3 is in the low level in the period of time $t=t_2$ to $t_3$ corresponds to the state where the distance between the process nozzle 53 and the workpiece 55 is not optimized, and the reflection light 62 of the distance measurement laser beam 500 (refer to FIG. 6) is weak. As will be described later, the state that the logic signal LS3 is at the high level at and after the time $t=t_3$ indicates that, at time $t=t_2$, the sensor 6 detects that the reflection light 62 from the workpiece 55 has predetermined intensity or higher and, on the basis of the detection result, the auxiliary controller 7 outputs the logic level LS3 of the high level.

In step S205, the logical operation unit 28 performs logical operation using the pulse signal LS2 and the logic signal LS3 of the low level and outputs the logical operation result LS5. The logical operation in this case is logical product ("AND"). FIG. 9 shows the waveform of the logical operation result LS5. Since the logic signal LS3 is at the low level in the period of the time $t=t_2$ to $t_3$, the waveform of the logical operation result LS5 is at the low level and is not observed as a pulse waveform. On the other hand, the pulse P52 of the logical operation result LS5 corresponding to the pulse P42 of the pulse signal LS2 is at the low level until the time $t=t_3$ but becomes the high level at and after the time $t_3$. The waveforms of pulses P53 to P55 of the logical operation result LS5 are similar to those of pulse signals P43 to P45 of the pulse signal LS2.

In the following step S206, the switching device 27 generates the laser drive signal AS2 from the analog signal AS1 on the basis of the logical operation result LS5. As shown in FIGS. 7 and 9, in the period of the time $t=t_2$ to $t_3$, the switching device 27 enters the off state when the logical operation result LS5 is at the low level, and the laser drive signal AS2 becomes 0 [V]. On the other hand, at and after the time $t=t_3$, the switching device 27 enters the on state when the logical operation result LS5 is at the high level, and the laser drive signal AS2 becomes the same Vc [V] as that of the analog signal AS1. As a result, the laser drive signal AS2 has the maximum value of Vc [V] and its pulse waveform has a transmission cycle similar to that of the logical operation result LS5. The on/off state of the signal in the switching device 27 is reflected in the laser output within 10 [μs].

FIG. 9 shows the waveform of the laser drive signal AS2. In the period of the time $t=t_2$ to $t_3$, the waveform of the laser drive signal AS2 is always 0 [V]. On the other hand, a pulse P62 of the laser drive signal AS2 corresponding to the pulse P52 of the logical operation result LS5 is 0 [V] until the time $t=t_3$ but becomes Vc [V] at and after the time $t_3$. As shown in FIG. 7, in the embodiment, to apply the distance measurement laser beam for measuring the distance between the process nozzle 53 and the workpiece 55, the distance measurement signal ASM is added to the laser drive signal AS2 by a second adder 252. In addition, in the case of adding the bias instruction signal ASB by a first adder 251, the waveform of a laser drive signal AS4 to which the distance measurement voltage and the bias instruction signal are added becomes a signal waveform obtained by adding a predetermined bias instruction signal ASB and the distance measurement signal ASM to the laser drive signal AS2 as shown in FIG. 9. As a result, the waveform of the laser drive signal AS4 becomes a pulse waveform having pulses P71 to P75 similar to the pulses P61 to P65 of the laser drive signal AS2. In the period of time $t=t_2$ to $t_3$, the laser beam for processing a workpiece is not output but only the distance measurement laser beam is output.

In step S207, the laser power supply unit 31 receives supply of power from the power supply 4 and generates laser excitation energy in accordance with the laser drive signal AS4 obtained by adding the distance measurement signal ASM and the bias instruction signal ASB to the laser drive signal AS2, which is supplied via the interface 26. In the period of time t=$t_2$ to $t_3$, the laser drive signal AS2 is 0 [V], so that the signal AS4 is a signal obtained by adding the distance measurement signal ASM and the bias instruction signal ASB. Since the magnitude of the bias instruction signal ASB is small, the laser excitation energy is generated according to the distance measurement signal ASM. The distance measurement laser drive signal AS4 obtained by adding the distance measurement voltage and the bias instruction voltage indicates a predetermined voltage value in the period of the time t=$t_2$ to $t_3$ and has a pulse waveform determined by the digital signals DS1 and DS2 and the logic signal LS3 at and after time t=$t_2$, so that the excitation energy has a pulse waveform similar to P61 to P65.

In step S208, the discharge tube 32 outputs the distance measurement laser beam 500 using the excitation energy. Specifically, the excitation energy is supplied to the discharge tube 32, the laser medium sandwiched between the output mirror 34 and the rear mirror 33 oscillates, and the distance measurement laser beam 500 is output. The distance measurement laser beam 500 output from the discharge tube 32 is guided to the process head 5 by using the reflecting mirror 51 or an optical fiber (not shown).

In step S209, the process head 5 irradiates the workpiece 55 with the distance measurement laser beam 500 output from the discharge tube 32. Concretely, by the lens 52 provided in the process head 5, the distance measurement laser beam 500 is condensed on the workpiece 55. The distance measurement laser beam 500 passes through the process nozzle 53 provided at the tip of the process head 5 and falls on the workpiece 55.

In step S210, the sensor 6 measures the intensity of the reflection light 62 from the workpiece 55. As shown in FIG. 2, the laser processing system 11 has the sensor 6 for measuring the intensity of the reflection light 62. As shown in FIG. 6, the distance measurement laser beam 500 is reflected by the workpiece 55 and its reflection light 62 is detected by the sensor 6. At a stage the process head 5 is not close enough to the workpiece 55 and the distance between them is not optimized, the position of the focal point 57 of the distance measurement laser beam 500 is above the workpiece 55 as shown in FIG. 6A. Consequently, the intensity of the reflection light 62 is weaker than that in the case where the position of the focal point 57 of the distance measurement laser beam 500 matches the position on the surface of the workpiece 55 as shown in FIG. 6B. From the sensor 6 which detects the reflection light 62, a signal according to the intensity of the reflection light 62 is transmitted to the auxiliary controller 7.

In step S211, the auxiliary controller 7 monitors a change in the intensity of the reflection light 62. Since the signal according to the intensity of the reflection light 62 is received from the sensor 6 from moment to moment, the auxiliary controller 7 can detect a change in the intensity of the reflection light 62.

In step S212, the auxiliary controller 7 determines whether or not the intensity of the reflection light 62 is equal to or higher than a threshold. The threshold may be set to the intensity of reflection light generated when the distance between the process nozzle 53 and the workpiece 55 is optimized. When the intensity of the reflection light 62 is less than the threshold, the program returns to step S201, the distance between the process head 5 and the workpiece 55 is changed, and application of the distance measurement laser beam is continuously executed.

On the other hand, when the intensity of the reflection light 62 is equal to or higher than the threshold, it is determined that the distance between the process nozzle 53 and the workpiece 55 is optimized. In step S213, the auxiliary controller 7 outputs the logic signal LS3 of the high level. As shown in FIG. 9, the logic signal LS3 changes from the low level to the high level at the time t=$t_3$.

In step S214, the logical operation unit 28 performs logical operation using the pulse signal LS2 and the logic signal LS3 of the high level and outputs the logical operation result LS5 of the high level. The logical operation performed by the logical operation unit 28 in this case is logical product ("AND"). FIG. 9 shows the waveforms of the pulse signal LS2, the logic signal LS3, and the logical operation result LS5. Also at and after the time t=$t_3$, the pulse signal LS2 does not change. However, the logic signal LS3 becomes the high level, so that the logical operation result LS5 as the AND of the pulse signal LS2 and the logic signal LS3 becomes a signal similar to the pulse signal LS2. The timing when the logic signal LS3 changes from the low level to the high level is not related to the rising time and the trailing time of the pulse signal LS2. Consequently, the pulse P52 of the logical operation result LS5 changes forcedly to the high level before the rising edge of the pulse.

In step S215, the switching device 27 generates the laser drive signal AS2 of the crest value Vc [V] on the basis of the logical operation result LS5 of the high level. FIG. 9 shows the waveform of the laser drive signal AS2. At and after the time t=$t_3$, the logical operation result LS5 is at the high level, so that the switching device 27 is in the on state, and the laser drive signal AS2 has the pulse wave of the crest value Vc [V]. As described above, the logical operation result LS5 becomes forcedly Vc [V] at the time t=$t_3$. Consequently, the laser drive signal AS2 also becomes forcedly Vc [V] during the cycle of the pulse P62 before the rising edge of the pulse P63. As a result, the laser drive signal AS4 obtained by adding the distance measurement signal ASM and the bias instruction signal ASB to the laser drive signal AS2 forcedly comes to have a pulse waveform in which the voltage obtained by adding the distance measurement voltage and the bias voltage to Vd [V] is the crest value during the cycle of the pulse P72 before the rising edge of the pulse P73 at the time t=$t_3$. In step S216, the laser processing system 11 transmits a laser output for processing. The time since the sensor 6 senses the reflection light 62 exceeding the threshold until the laser beam is output is 10 [µs] or less.

In such a manner, the reflection light 62 from the workpiece 55 is monitored and, at the moment the distance between the process nozzle 53 provided at the tip of the process head 5 and the workpiece 55 is optimized, outputting of the laser can be started. As a result, the time since the distance between the process nozzle 53 and the workpiece 55 is optimized until the laser process is started can be made shortest.

In the second embodiment, the example of supplying the distance measurement laser output signal DS5 is supplied from the numerical control device 1 to the interface circuit 20 to output the distance measurement laser beam 500 has been described. However, the present invention is not limited to this embodiment. That is, to output the distance measurement laser beam 500, in place of supplying the distance measurement laser output signal DS5, the distance measurement laser beam may be applied to the workpiece to the processed by using the excitation energy weaker than the laser beam for process as the laser output signal DS3.

It will be described that the invention according to the second embodiment is also effective for the control of the timing of starting the piercing process. In the case of cutting a metal plate as the workpiece with a laser beam, the workpiece of about 2 [m]×4 [m] is cut. Generally, the process head is moved from one cutting part to another cutting part in a state where the process head is lifted rather high in order to prevent collision between the workpiece and the head. At the next cutting start point, the process head is moved downward to approach the workpiece and positioned at a height optimum for the piercing process, and the piercing process is started. When the piercing process is performed after confirming that the height is optimum, it takes some time until the Z axis stops. However, there is margin in the height of the process head at which the piercing process can be started. When the Z axis reaches a predetermined height or lower, even if the Z axis does not stop, the piercing process can be started.

Consequently, the measurement result of the intensity of the reflection light for measuring the distance between the workpiece 55 and the process nozzle 53 may be transmitted from the sensor 6 to the auxiliary controller 7. In the case where the process head 5 is approaching the workpiece 55, at the moment the distance between the process head 5 and the workpiece 55 enters a predetermined range, the control signal LS3 may be switched so as to start the piercing process. In this case, the piercing process actually starts immediately after the piercing process is ready to be started, wasted time can be eliminated, and the process time can be shortened.

Third Embodiment

A laser processing system according to a third embodiment will now be described. A general configuration of the laser processing system according to the third embodiment is similar to that of the laser processing system according to the first embodiment shown in FIG. 2. FIG. 10 shows the configuration of an interface circuit 200 in the laser processing system according to the third embodiment. The point different from the interface circuits 2 and 20 of the first and second embodiments is that a logical operation unit 29 further comprises a switching circuit 30 for switching use/non-use of the logic signal LS3 output from the auxiliary controller 7.

The switching circuit 30 can perform the switching by a switching control signal LS1 from the numerical control device 1. For example, as shown in FIG. 10, when the switching circuit 30 switches to a terminal "a", the logic signal LS4 of the logical operation unit 29 can be set to the low level. When the terminal is switched to a terminal "b", the logic signal LS4 can be set to the high level. When the terminal is switched to the terminal "a" or "b", the logic signal LS3 output from the auxiliary controller 7 is not used for output control of the laser beam. On the other hand, when the terminal is switched to a terminal "c", the logic signal LS4 of the logical operation unit 29 can use the logic signal LS3 output from the auxiliary controller 7 as it is. On the other hand, when the terminal is switched to a terminal "d", an inversion signal of the logic signal LS3 output from the auxiliary controller 7 by an inverter 301 can be used. When the terminal is switched to the terminal "c" or "d", the logic signal output from the auxiliary controller is used for output control of the laser beam.

An example of switching the logic signal output from the auxiliary controller 7 by using the switching circuit 30 as described above will be explained. The process head 5 is brought close to the workpiece 55 as shown in FIG. 2 and, when the distance between the process head 5 and the workpiece 55 is optimized, the piercing process is started. In a state where the process head 5 is positioned sufficiently above the workpiece 55, the laser beam 50 whose output is extremely small like a few [W] to ten or larger [W] is applied. As the focal point approaches the workpiece 55 with downward movement of the process head 5, the amount of the laser beam 50 which returns to the laser oscillator 3 via the lens 52 increases. The amount is detected by the sensor 6. When the amount of the return light becomes equal to or larger than a predetermined amount, the laser output is increased at once. By the operation, a key hole is formed instantaneously in the surface of the workpiece 55, and the piecing process proceeds. If the timing deviates, in the workpiece having high reflectance such as copper, the laser energy density is not high enough for formation of a key hole, and all of the laser energy travels opposite in the mechanical optical path. The state is extremely dangerous for the device, but it can be prevented.

To realize it, the terminal "c" is selected in the switching device 30, an override signal corresponding to 0.5% output is applied from the auxiliary controller 7, and the laser beam 50 whose output is extremely small such as a few [W] to ten or larger [W] is applied. The numerical control device 1 gives a laser output instruction necessary for the piercing process to the interface circuit. When the process head 5 is above the workpiece 55, an override signal corresponding to 0.5% output is applied from the auxiliary controller 7, so that the laser output is suppressed to be small by the function of a multiplier C1.

The process head 5 gradually approaches the workpiece 55 and weak return light is becoming larger. The intensity of the return light at height at which the piercing process can be started is preliminarily set as a determination value. At the moment the return light exceeds the determination value, the switching circuit 30 switches to select the terminal "b". In this case, the override signal from the auxiliary controller 7 is 5 [V], that is, 100% output. The laser output increases at once, and the piercing process proceeds. By employing such a configuration, after the distance between the process head 5 and the workpiece 55 is optimized, the piercing process can be instantaneously started, so that the time can be shortened.

In the above-described example, the laser output instruction from the numerical control device 1 is not stopped to be transmitted but can be increased or decreased by the signal from the auxiliary controller 7. Even in the case of a logic signal indicating stop of transmission from the auxiliary controller 7, similar operation can be performed. Although the time since the instruction of setting the value of excitation energy is given to the laser power supply unit 31 until the laser beam is actually output is extremely short, very small delay time occurs. The reason is that there is a time difference between excitation of the laser medium and actual occurrence of laser amplification in addition to various lag elements in the circuit of the laser power supply unit 31. Although it depends on the kinds of lasers, a delay of ten nanoseconds to a few milliseconds occurs.

A control signal from the auxiliary controller 7 is given as a pulse sequence, and its frequency is set to be high in proportion to laser response speed. Specifically, in a laser in which response time constant of the laser output to an analog laser output instruction is 100 [μs], the frequency is set to, for example, 25 [kHz]. When a control is performed with pulse duty of 0 to 1000%, the response frequency of the laser is low for the frequency of a control signal. Consequently, even in a laser output instruction having a rectangular pulse, a laser output having a triangular wave is obtained. The laser output can be substantially increased or decreased by the pulse duty.

In such a manner, the laser output can be increased or decreased by a logic signal from the auxiliary controller 7. There is a characteristic such that as compared with the case of increasing or decreasing a laser output by an analog signal, an instruction voltage is not offset from an instruction at 0 [W] or the like or rated output, and an accurate instruction can be given. Further, when a pulse instruction of a few [kHz] to five

[kHz] is given from a pulse signal generator, although the actual laser output is a pulse-shaped laser output according to the instruction from the pulse signal generator, an output can be controlled by the auxiliary controller.

The example of using light radiated or reflected from a workpiece which is irradiated with a laser beam has been described above. Alternatively, various sensors such as a sensor detecting temperature of a workpiece, a sensor detecting sound generated from a workpiece, and a sensor detecting a change in pressure caused by a workpiece can be provided. Signals from the sensors can be designed so that arithmetic process can be performed freely in the above-described interface circuit.

What is claimed is:

1. A laser processing system, comprising:
    a laser generating device configured to generate a laser beam for processing a workpiece;
    a moving mechanism configured to move the workpiece relative to the laser beam;
    a numerical control device which is
        coupled to the moving mechanism, and configured to transmit a movement amount for moving the workpiece to the moving mechanism in a transmission cycle,
        coupled to the laser generating device via an interface circuit, and configured to output a laser output signal and a digital signal to the interface circuit, in predetermined transmission cycles synchronized with the transmission cycle of the movement amount for moving the workpiece, wherein
            the laser output signal determines an intensity of the laser beam, and
            the digital signal determines a transmission period and a stop period of the laser beam;
    an auxiliary controller configured to generate a logic signal which forcedly controls transmission or stop of the laser beam;
    the interface circuit interposed between the laser generating device and the numerical control device, the interface circuit coupled to an output of the auxiliary controller and comprising:
        a converter coupled to an output of the numerical control device, and configured to convert the laser output signal to an analog signal;
        a pulse signal generator coupled to the output of the numerical control device, and configured to generate a pulse signal for controlling the analog signal on the basis of the digital signal;
        a logical operation unit coupled to the output of the auxiliary controller and an output of the pulse signal generator, and configured to perform a logical operation between the pulse signal and the logic signal and to output a result of the logical operation; and
        a switching device coupled between an output of the converter and an input of the laser generating device, the switching device further coupled to an output of the logical operation unit and configured to generate a laser drive signal for alternately transmitting and stopping the laser beam on the basis of the result of the logical operation; and
    a sensor coupled to an input of the logical operation unit, and configured to measure an intensity of light radiated or reflected from the workpiece irradiated with the laser beam which is output in accordance with the laser drive signal,
    wherein the auxiliary controller is configured to generate the logic signal in accordance with the intensity of the light measured by the sensor, and
    wherein each one of said converter, said pulse signal generator, said logical operation unit and said switching device in the interface circuit is operated within a shorter period than the predetermined transmission cycles.

2. The laser processing system according to claim 1, wherein when the intensity of the light radiated from the workpiece measured by the sensor is equal to or higher than a predetermined intensity, the auxiliary controller is configured to output a logic signal for stopping the laser beam.

3. The laser processing system according to claim 1, wherein when the intensity of the light reflected from the workpiece measured by the sensor is equal to or higher than a predetermined intensity, the auxiliary controller is configured to output a logic signal for transmitting the laser beam.

4. The laser processing system according to claim 1, wherein the logical operation unit further comprises a switching device configured to switch, in accordance with a control signal sent in the predetermined transmission cycles from the numerical control device, between use and non-use of the logic signal output from the auxiliary controller.

5. The laser processing system according to claim 1, wherein
    the laser generating device comprises a process nozzle from which the laser beam is to be outputted,
    the numerical control device is further configured to output a distance measurement laser output signal for causing the laser generating device to irradiate, from the process nozzle, a distance measurement laser beam for measuring a distance between the process nozzle and the workpiece, and
    the laser beam for processing the workpiece is output at the moment the distance between the process nozzle and the workpiece is optimized in accordance with an intensity of reflection light reflected from the workpiece irradiated with the distance measurement laser beam.

6. The laser processing system according to claim 5, wherein when the intensity of the light radiated from the workpiece measured by the sensor is equal to or higher than a predetermined intensity, the auxiliary controller is configured to output a logic signal for stopping the laser beam for processing the workpiece.

7. The laser processing system according to claim 5, wherein when the intensity of the light reflected from the workpiece measured by the sensor is equal to or higher than a predetermined intensity, the auxiliary controller is configured to output a logic signal for transmitting the laser beam for processing the workpiece.

8. The laser processing system according to claim 5, wherein the logical operation unit further comprises a switching device configured to switch, in accordance with a control signal sent in the predetermined transmission cycles from the numerical control device, between use and non-use of the logic signal output from the auxiliary controller.

9. The laser processing system according to claim 5, wherein the logical operation unit further comprises a switching circuit configured to switch use/non-use of the logic signal output from the auxiliary controller in the predetermined transmission cycles.

* * * * *